April 21, 1959 — H. C. WEIST — 2,882,956
PLASTIC BAG MAKING MACHINE
Filed Nov. 9, 1956 — 4 Sheets-Sheet 1
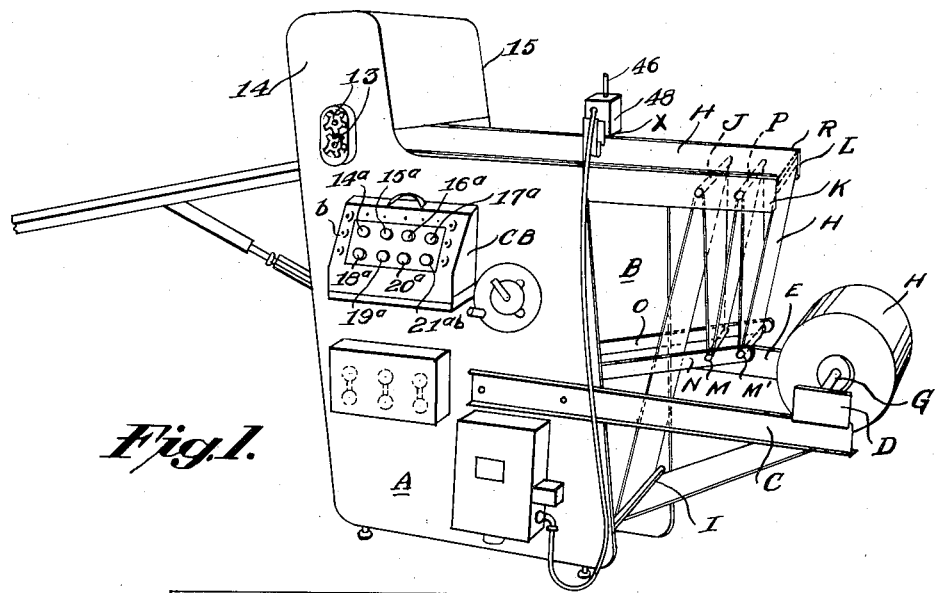
Fig. 1.
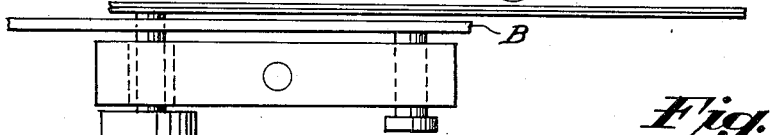
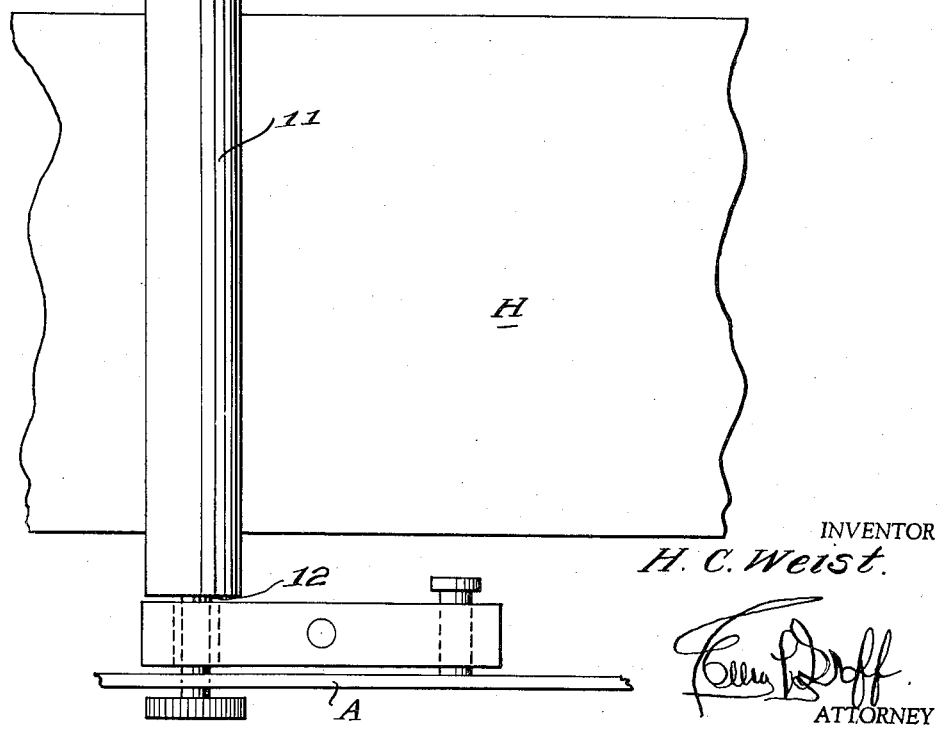
Fig. 2.
INVENTOR
H. C. Weist.
ATTORNEY April 21, 1959 H. C. WEIST 2,882,956
PLASTIC BAG MAKING MACHINE
Filed Nov. 9, 1956 4 Sheets-Sheet 2
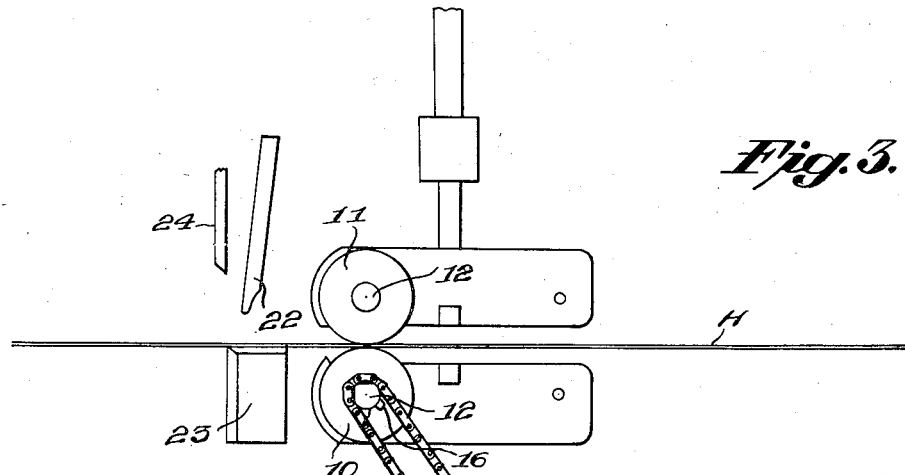
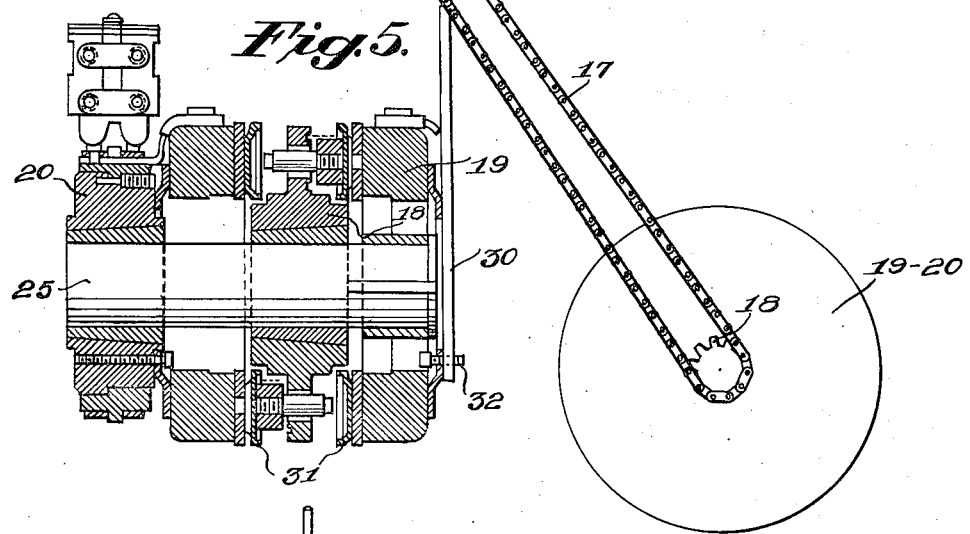
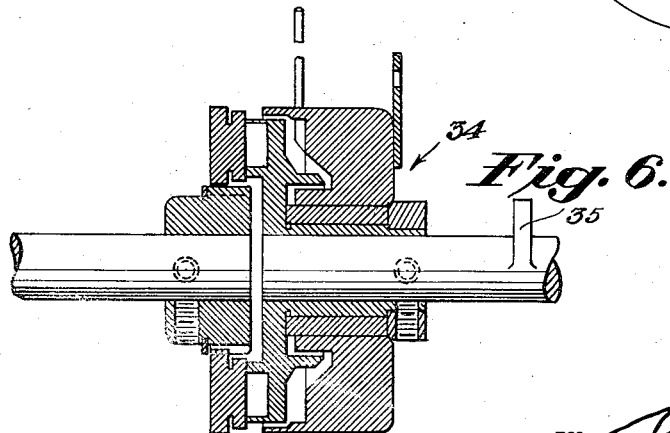
INVENTOR
H. C. Weist.
BY
ATTORNEY April 21, 1959 H. C. WEIST 2,882,956
PLASTIC BAG MAKING MACHINE
Filed Nov. 9, 1956 4 Sheets-Sheet 3

INVENTOR
H. C. Weist
BY
ATTORNEY

April 21, 1959     H. C. WEIST     2,882,956
PLASTIC BAG MAKING MACHINE
Filed Nov. 9, 1956     4 Sheets—Sheet 4

INVENTOR
H. C. Weist.
BY
ATTORNEY

United States Patent Office 2,882,956
Patented Apr. 21, 1959

2,882,956

PLASTIC BAG MAKING MACHINE

Herman C. Weist, Louisville, Ky.

Application November 9, 1956, Serial No. 621,396

8 Claims. (Cl. 154—42)

My present invention relates to a machine for making bags from webs of polyethyline or other similar materials.

An object of my invention is to provide a rapid cycle of operation to permit mass production of bags.

Another object is to provide a novel electrical control of the web material for forming the bags.

A further object of the invention is to provide a novel combination of electronic timer control means for punching, sealing and cutting folded web material.

With these and other objects in view, the invention consists in the construction, arrangement and combination of parts hereinafter described and particularly pointed out in the claims, it being understood that it is not intended to limit the same to the details of construction.

In the drawings like parts throughout the several views are given like numerals and are thus identified in the following detailed description, wherein:

Fig. 1 is a side elevational view of the machine.

Fig. 2 is a partial top plan view of the web and the feed rollers therefor.

Fig. 3 is a side schematic view of the feed rollers with their mountings and drive connections to the clutch-brake means.

Fig. 5 is a detail of one form of combination electro-magnetic clutch-brake used to control the feed rollers.

Fig. 6 is a detail of one form of electromagnetic clutch used to impart drive to the electric meter arm for ultimate brake operation to stop the feed rollers for the punching, cutting, and cut end sealing operations.

Similar reference characters designate corresponding parts throughout the several figures of the drawing.

Figure 4:
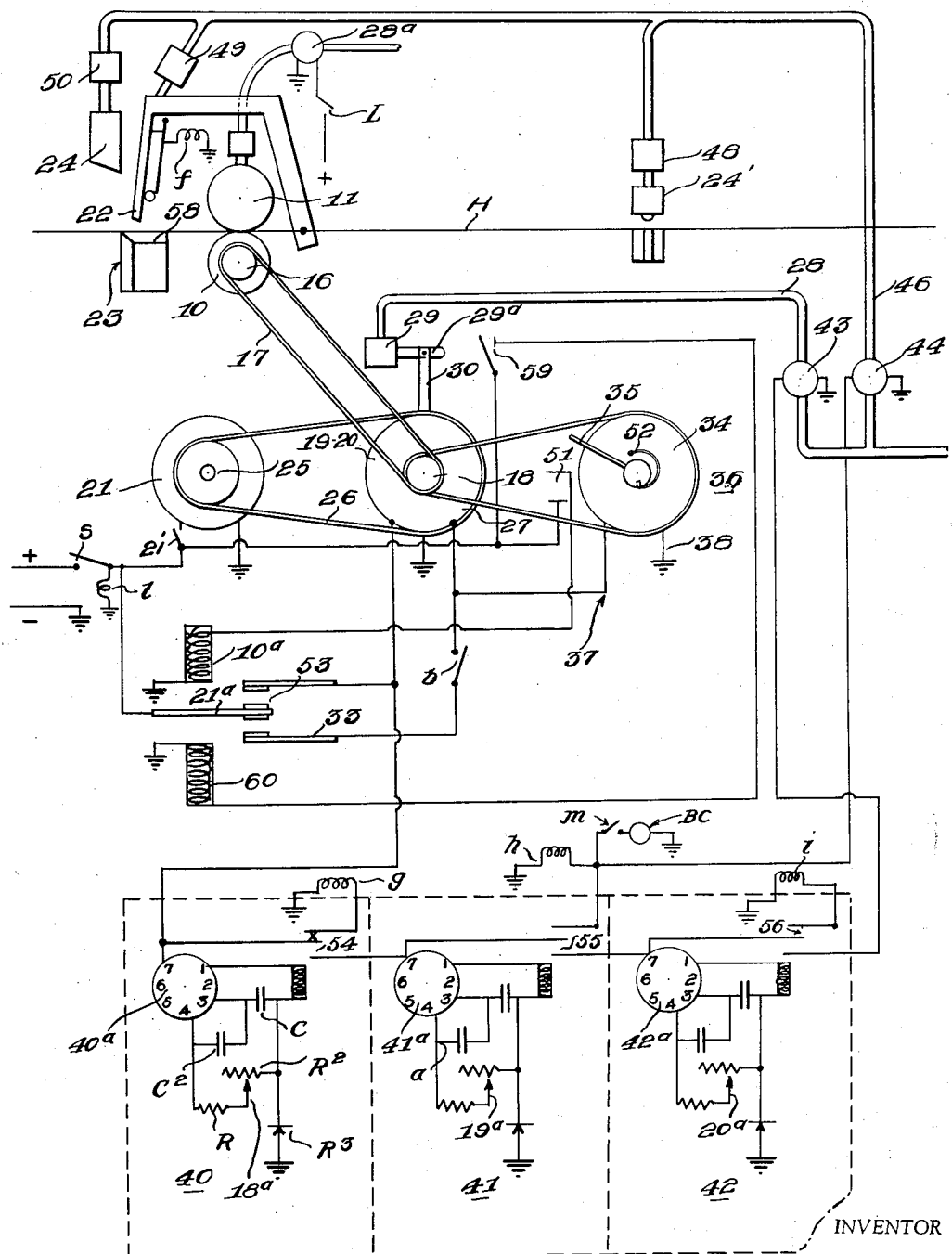
Fig. 4 is a schematic diagram of the complete machine.

Generally, first with reference to Fig. 1, the machine comprises a frame structure having sheet metal side portions A and B, and rearwardly extending bars C and E with bearings D at their adjacently spaced ends for mounting a spindle G. The spindle G carries a roll of two-ply or flattened tubular material H to be used for making the bags, by predetermined spaced cutting of one end of the double web and sealing of the opposite end. The material H is reeved around a bar I mounted between the lower front part of the base of each sheet metal side portion A and B, upwardly over a second bar J mounted between spaced bracket members K and L, and downwardly around and under a transverse bar M between a pair of bracket arms N and O mounted below the other said spaced bracket members and thence upwardly and over still another guide bar P supported between the arms K and L and downward under bar M' and finally upward and forward over the rounded edge of the material feed table to the several working stations hereinafter described. Thus the web H extends forward between the feed rollers 10 and 11, see Figs. 3 and 4.

Also, a suitable bed plate for the web H may be provided, if needed.

These rollers are each mounted on a shaft 12 with a drive gear 13, see Fig. 1, on one end of each shaft, which is suitably journalled between spaced forwardly offset upward projecting side portions 14 and 15 of the sheet metal sides A and B. The lower roller 10 on one end of its shaft 12 has a sprocket 16, see Fig. 3, which is driven through a drive chain 17 reeved around a second sprocket wheel 18 on the shaft of a combination brake and clutch drive 19—20, see Figs. 4 and 5. This combination is power driven by an electric drive means, such as a suitable electric motor 21. This motor may be manually controlled by a switch 21'.

Positioned ahead of the feed rollers 10 and 11 toward the front of the frame is a power controlled sealer bar 22 and slightly spaced therefrom and in advance thereof are cutter means 23 and 24 for intermittent cyclic operation, while rearward of the rollers is a punch means 24'. These are each under control of electrical timer means to be hereinafter described with particular reference to Fig. 4.

Figure 8:
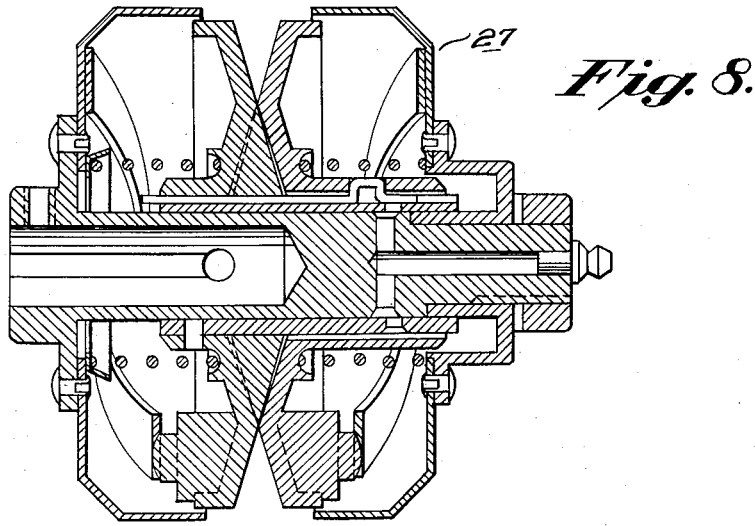
Fig. 8 is a cross section view of a variable speed drive pulley, such as may be used to connect the clutch-drive means of the machine.

The electric motor 21 is connected to the shaft 25 of the clutch part 20 of the clutch-brake combination 19—20 by a V-belt 26 reeved around a suitable variable speed pulley 27, such as illustrated in Fig. 8, and this clutch 20 is rotated constantly upon running the electric motor 21, see Fig. 5. The clutch 20 runs continuously when the motor 21 is running and is actually engaged to drive only when the material H is intermittently drawn through the machine by the operation of the rollers 10 and 11 of the machine. The steel discs 31 of Fig. 5 are connected to the web pulling rollers 10 and 11 by the chain drive 16, 17 and 18, and also to a second electric clutch 34, hereafter called the metering clutch. When clutch 20 is activated or energized, it couples to the steel discs 31 by magnetic force and turns these discs at the same speed as part 20, which also turns metering arm 35 attached to a similar steel disc of the metering clutch 34.

The part 19 is the brake means and has connected thereto by screws 32, an arm 30, see Fig. 5. This arm 30 and its particular control function in the machine will be described hereinafter.

In Fig. 4 there is disclosed a clutch control relay 33 adapted to be energized by closing switch "b" to start the operation of the machine. This clutch relay 33 is closed when the machine is stopped at the start of each cycle and when the switch "b" is closed both of the clutches 20 and 34 are energized for driving their respectively associated parts.

When the second clutch 34, see Fig. 6, becomes energized it drives the metering arm 35 of a meter device 36 connected by leads 37 and 38 to a series of electronic timer means 40, 41 and 42, which in turn control solenoid valves 43 and 44, in fluid power lines or pressure conduits 28 and 46 connected to a brake reversing cylinder 29 connected by link 29a to brake arm 30, punch controlling cylinder 48, sealing bar cylinder 49 and cutter operating power cylinder 50. Thus when the meter arm 35 moves to a contact 51 in the electric power circuit against the resistance of a spring 52, the brake relay 10a actuates the contacts 53, thereby energizing the brake 19 and the clutches 20 and 34 are deenergized for a time or period under control of the charging period of the condenser circuit of the first electronic timer 40, which is triggered by its tube 40a in the meter arm circuit. This preliminary delay or dwell period permits the web of the machine time to stop. Thus clutch 20 causes the rollers 10 and 11 to pull the web H through the machine and clutch 34 moves the arm 35 to close switch 51 to energize brake 19 and also supply current to the timer means, until switch 59 finally closes to operate the polarized relay 21ª.

Each of the timer means are comprised of a vacuum tube 40ª shown diagrammatically with the plate connected in the circuit from the metering arm 35, which will trigger the tube of the first timer 40, and the rest of the timer circuit includes a condenser C, in this instance a 2 m.f.d. condenser, a second condenser C² of, for example, a .5 m.f.d., a 10,000 ohm D.C. plate relay 54, a resistor R of 1½ megohms, a second variable resistor R² of, for example, 2 megohms and a rectifier R³, such as a 75 ma. selenium rectifier.

When timer relay 54 closes it energizes or triggers the tube 41ª of the timer 41, which also permits operating of solenoid valve 44, which operates punches 48, sealer bar cylinder 49 and the cutter motor 50. Relay 55 closes and triggers tube 42ª of the timer 42, to thereby energize relay 56 to operate solenoid valve 43. This permits air to pass to brake control cylinder 29 and will move arm 30 attached to the brake portion 19 of the combination unit 19—20. As the arm 30 is moved, such brake engagement momentarily drives the feed rollers 10 and 11 reversely through the brake disc engagement, and pulls loose the sealed edge of polyethylene or other material, from the lower cold bar 58 of the sealer, until the brake control arm 30 swings far enough to close switch 59 and energize the polarized relay 21ª including the coil 60, thereby releasing brake relay 53 and reclosing clutch relay 33 to again throw in clutch control relay 33 and the clutches 20 and 34 to repeat the cycle.

The machine may also include an electric eye pick-up, such as any suitable form of photo-electric cell X. This cell is positioned to pick-up a printed mark on the material H, which material is usually a polyethylene tube in flat condition. When this mark passes the photo-cell stations it breaks the cell beam, thereby operating the elements of the machine instead of the meter arm and switch 51. Thus either the electric eye pick-up or the meter switch 51 will operate the machine, each overriding the other. The photo cell switch, not shown, is controlled by knob 21ᵃᵇ and may be opened to connect the wiring of the cell X, so that the metering switch 51 must be closed before the cell X becomes activated. This permits all printing on a bag to be skipped, until the metering switch is closed and the cell may then be only activated by one predetermined mark on the bag web. This electric eye is preferably positioned just adjacent the punch head 24′ and rearward of the air line to the punch cylinder 48 and only is used when the web H is marked in some manner required for a particular order by a customer.

Figure 7:
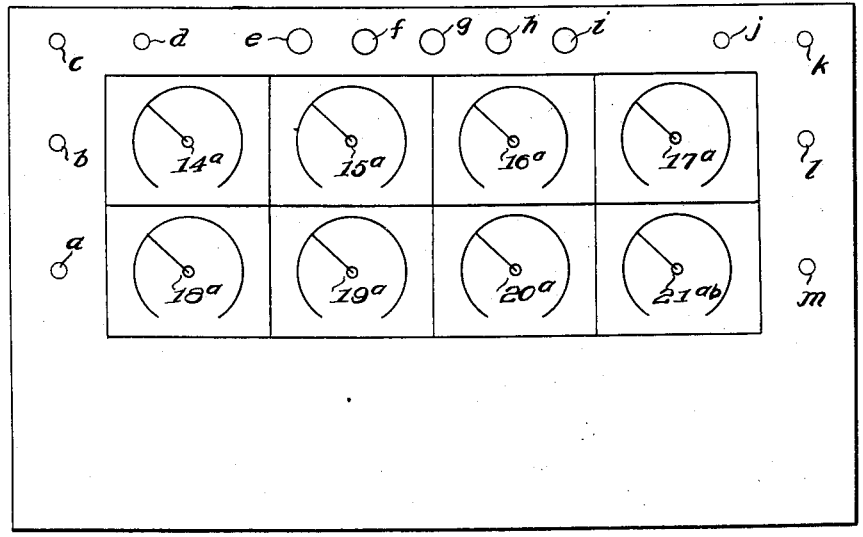
Fig. 7 is a front face view of the panel of a control box for the machine.

The entire machine is controlled by a control box generally designated CB, see Fig. 1, and the electric eye X may be cut out or regulated for its time of actuation by turning the knob 21ᵃᵇ electrically connected thereto by a suitable switch, not shown. This control box panel generally appears as illustrated in Fig. 7, and houses the electric timer means 40, 41 and 42 shown diagrammatically in Fig. 4. For example, around the perimeter of the panel are thirteen elements, *a, b, c, d, e, f, g, h, i, j, k, l,* and *m* which connect with the operating circuit of Fig. 4 to control the elements as follows:

"*a*" is a switch that cuts in a second condenser of timer number 41 to increase the time of operation thereof beyond its original designated time if desired.

"*b*" is a switch to control the clutch circuit to clutch means 19 and 34.

"*c*" is a switch to independently or manually control the motor 21.

"*d*" is the master switch to connect the control box with the power line.

"*e*" is a light bulb which is connected in the power line to turn on when the machine is started.

"*f*" is a light which turns on when the sealing bar is heating.

"*g*" is an electric lamp which turns on during operation of timer, 40, "*h*" and "*i*" are also light bulbs that turn on during operation of timers 41 and 42.

"*j*" represents a switch to turn on the current to the photo-cell X, which switch connects to a power line leading from the switch box SB, see Fig. 1.

"*k*" represents a switch to turn on the current to the sealing bar 23.

"*l*" is a switch to control the opening of a solenoid valve 28ª allowing air to feed into air cylinders 28, to thereby move the rollers 10 and 11 together.

And "*m*" is a switch to turn on a bag counter BC, which is operatively connected in the operating circuit of the machine.

The remaining face of the control box panel includes variable resistor elements 14ª and 17ª, each one of which controls the current supply to the electric brake 19. If a larger machine is used feeding several webs then one of the variable resistors operates a similar associated brake for each of the various unwinds of each web. For simplicity only one brake is illustrated in the present case connected to element 14ª.

The variable resistors 18ª, 19ª, and 20ª control the trigger tubes of the timers 40, 41, and 42, as disclosed in Fig. 4 and switch 21ª controls the photo-cell circuit, see Fig. 1.

*Operation*

To start operation of a single web machine a main power starter switch S and the control box switches are closed to energize the electrical circuit to the switch 21′ and the electric motor 21, which turns the clutch discs 31 of the clutch 20 and the various driven elements of the machine.

To start the actual bag forming cycle switch "*b*" is closed, which activates both electric clutches 20 and 34. The electric clutch 20 turns feed rollers 10 and 11, which pull the polyethylene web H (or other material) through the machine. The electric clutch 34 also turns the metering arm 35, which is set to start at a predetermined distance from switch 51, this distance of the arm travel governs the length of the bag or feed of the material H being processed in the machine. When meter arm 35 makes contact to close the switch 51, it energizes winding 10ª of a latch type, polarized, or other switching type relay 21ª, which closes the brake relay 53 and releases the clutch relay 33, which in turn deactivates electric clutches 20 and 34, allowing coiled spring 52 connected to the meter arm 35 to reset to its original preset starting point. This also operates electric brake 19 and triggers the tube 40ª of the timer 40. After triggering the timer 40 there is a short predetermined delay required to charge the condensers C and C², during which time the brake 19 being in operation causes the web H to stop. When the condensers discharge the relay 54 on timer 40 is closed and triggers the tube 41ª of the timer 41, which as its condensers discharge operates solenoid air valve 44 permitting air to flow to fluid motors 48, 49 and 50, to thereby operate punches 24′, heater and sealer means 22 and cutting means 23—24. A predetermined delay is also caused by the charging of timer condensers in timer 41, allowing enough time to complete these operations. Then as the condensers of timer 41 discharge the relay 55 closes and triggers electronic tube 42ª to start timer 42, which, after a short predetermined condenser charging period, during which time punches 24′, sealer bar 22 and cutting means 23—24 are caused to return to their respective normal positions and the counter BC is actuated to count one bag formation. Also, discharge of timer 42 causes the relay 56 to close and operate or energize the solenoid air valve 43, allowing air to pass to the fluid brake motor or air cylinder 29 and push the arm 30 attached to electric brake 19 rearward, which action in turn reverses the direction of rollers 10 and 11 and the web, to thereby pull loose the sealed bag edge of polyethylene or other material, from the cold bar of sealer 22. This reversing action continues, until the arm 30 closes switch 59, which energizes coil 60 in the switching relay 21ᵃ there by releasing brake relay 53 and closing clutch relay 33, which then activates electric clutch 20 to repeat the entire cycle.

Thus, by using the present novel electrical system of timed cycling, in combination, with air, hydraulic, or mechanical means, all time in starting and stopping the web, at predetermined lengths, cutting, sealing, punching or the like, returning the processing tools to their normal position, and re-cycling the machine, are automatically controlled. This eleminates prior manual control of the individual elements, thereby promoting mass production. Also, a much faster and more efficient operation for converting polyethylene and other materials into bags and the like may be performed, as control of the timing of each individual phase of the operation without regard to any other operation, is provided to impart timed control of the period of each operation.

Furthermore, by using this system of operation this machine can be set to cyclically perform at speeds in excess of 10,000 cycles per hour, and by using three or more individually controlled electric clutch-brake combinations and connecting them to variable resistors 15ᵃ, 16ᵃ and 17ᵃ, three or more webs may be processed simultaneously, thereby increasing production to exceed 30,000 units or bags per hour, for example.

Without further description, it is thought that the many advantages of the present invention will be apparent and while only one embodiment is illustrated, it is to be expressly understood the same is not limited thereto, as various changes may be made in the parts and combinations thereof as will now appear to those skilled in the art. For a definition of the limits of the invention, reference should be had to the appended claims.

I claim:

1. A bag forming apparatus comprising a supporting frame, feeding means supported by said frame for intermittently feeding a flat tube of bag forming material from a supply and along a path, bag forming means supported by said frame for operation on said tube along said path and during the time intervals between the intermittent feeding movements of the tube, a combined electro-magnetic clutch and brake means rotatably supported in said frame, a drive connection between said combined electro-magnetic clutch and brake means to said feeding means, a plurality of fluid supply lines each of which is provided with a solenoid valve, a plurality of fluid motors operatively connected to said bag forming means with which one of said fluid supply lines communicates, a fluid motor operatively connected to said feeding means, reversing means for slightly reversing the direction of said feeding means during said time intervals, said reversing means comprising a lever connected to said brake and to one of said fluid motors, a plurality of electronic timers supported by said frame for controlling said fluid motors and said solenoid valves, and a metering clutch rotatably supported in said frame for operatively controlling said electronic timers.

2. An electrically operated bag making machine comprising a frame for supporting and reeving out a roll of two-ply tubular material, a pair of feed rollers disposed transversely of the frame, a drive arrangement for said feed rollers, a group of tuned timer devices, an electric meter having a rotating contact arm, an electro-magnetic clutch-brake combination and electromagnetic clutch inter-drivably connected from said feed rollers to said meter contact arm, an electric motor adapted to drive said meter arm and said rollers through said clutches, a clutch control relay, a brake relay and a brake release relay, said meter arm being adapted to close a circuit to said clutch relay, declutch said clutches and energize the first of said tuned timers, said timer operating said brake by said brake relay, to thereby stop the rollers momentarily for the timed period of said first timer, said first timer, actuating a second timer, a solenoid controlled valve in a fluid line operated by said second timer, a fluid motor punch connected to said fluid line, an electrically heated heater bar connected in the energizing circuit of said second timer, a fluid motor operated cutter connected to a branch of said fluid line, said punch, said heater and said cutter being operated for the timed period of said second timer, said second timer prior to discharge energizing a third timer while permitting said punch, the heater and cutter to return to their prior neutral conditions and positions, said third timer being tuned so that after a delay the said brake relay is energized and the brake is released and said clutch relay becomes closed and said clutch members are again moved into driving connection to start a new cycle of operation.

3. A machine of the class described in claim 2, wherein the feed rollers are urged together by fluid pressure.

4. A machine of the class described in claim 3, wherein the feed rollers are each journalled in the free ends of spaced bracket arms, said arms being pivotally secured to each side portion of said frame.

5. A machine of the class described in claim 2, wherein in each of said timers include an electronic tube in circuit with condensers in circuit with the winding of control relay means, said condensers controlling the time delay thereof.

6. A machine of the class described in claim 2, wherein said meter arm is spring biased to starting position when said electromagnet clutch is declutched and said electromagnetically operated brake is applied.

7. A bag forming apparatus comprising power driven rollers adapted to pull a flattened tube of bag forming material from a supply station along a horizontal path, bag forming means positioned adjacent said flattened tubes of material, an electric motor, a variable speed drive connected to said rollers and driven by said motor, a clutch for connecting said motor with the said roller drive, a brake for stopping said motor at cyclic intervals, an electric meter device having a rotatable meter arm also driven by said motor, a meter arm return spring adapted to resist rotation of said arm, a meter arm actuated switch, an electric clutch relay and an electric brake relay adapted to be energized and de-energized by rotation and return of said meter arm, said arm being electrically connected and disconnected to the said respective clutch and brake relays by said switch, and a plurality of electronic timers also in said meter arm circuit the first of which timers is adapted to be triggered by the closing of said meter switch, said closing of said switch disconnecting said clutch, said timer including condenser means for providing a pre-dwell period when said motor is de-clutched to stop said feed rollers and said material and said meter arm being reset by said return spring, said brake relay thereby actuating said brake and connecting said first timer to trigger said second timer, said second timer being electrically connected to the solenoid of a valve adapted to activate the several bag forming means adjacent the web of material, said second timer having a condenser charging period to provide a predetermined working period for said bag forming means, said second timer means discharging and thereby triggering said third timer and permitting said bag forming means to return to each of their respective non-operative positions, said third timer when discharging actuating a solenoid air control valve in a fluid power line, a lever connected to said valve, said lever being carried by an element of said brake, a fluid motor power shaft connected to said brake lever actuated by said valve, to thereby move said brake lever reversely with the brake applied and slightly reverse said rollers, a brake release switch in the reverse path of said lever, said switch serving to de-energize said brake relay and close said clutch relay and re-energize said clutch, to thereby reset the apparatus.

8. The apparatus described in claim 7, including a photo-cell, a circuit for said cell connectable in the said meter circuit by a switch means, whereby when said photo-cell switch means is on, said photo-cell will override the meter circuit and control the bag forming means in accordance with the marking on said bag forming material.

References Cited in the file of this patent

UNITED STATES PATENTS

| 2,571,103 | Belcher et al. | Oct. 16, 1951 |
| 2,621,704 | Langer | Dec. 16, 1952 |
| 2,663,353 | Rohdin | Dec. 22, 1953 |
| 2,707,985 | Binnall | May 10, 1955 |
| 2,768,673 | Gaubert et al. | Oct. 30, 1956 |